United States Patent
Bishop et al.

(10) Patent No.: US 11,415,422 B2
(45) Date of Patent: Aug. 16, 2022

(54) FLOATING BUOY EXCURSION ANALYZER SYSTEM

(71) Applicant: Dunlop Oil & Marine Ltd., Pyewipe (GB)

(72) Inventors: Simon Bishop, Beverley (GB); Paul Staton, Grimsby (GB)

(73) Assignee: Dunlop Oil & Marine Ltd., Grimsby (GB)

( * ) Notice: Subject to any disclaimer, the term of this patent is extended or adjusted under 35 U.S.C. 154(b) by 0 days.

(21) Appl. No.: 16/944,501

(22) Filed: Jul. 31, 2020

(65) Prior Publication Data

US 2022/0034661 A1 Feb. 3, 2022

(51) Int. Cl.
| H04L 12/24 | (2006.01) |
| H04L 41/0803 | (2022.01) |
| G01C 21/20 | (2006.01) |
| H04L 12/66 | (2006.01) |
| H04L 67/12 | (2022.01) |

(52) U.S. Cl.
CPC ............ G01C 21/203 (2013.01); H04L 12/66 (2013.01); H04L 67/12 (2013.01)

(58) Field of Classification Search
CPC ........ G01C 21/203; H04L 12/66; H04L 67/12
USPC .......................................................... 701/494
See application file for complete search history.

(56) References Cited

U.S. PATENT DOCUMENTS

| 3,980,038 | A | * | 9/1976 | Dashew | ................ | B63B 22/021 |
| | | | | | | 114/230.21 |
| 8,653,967 | B1 | * | 2/2014 | Vosburgh | ................ | B63B 22/18 |
| | | | | | | 340/539.26 |
| 9,353,594 | B2 | | 5/2016 | Arya | | |
| 2003/0079553 | A1 | | 5/2003 | Cain et al. | | |
| 2008/0096448 | A1 | * | 4/2008 | Lokken | ................ | B63B 22/026 |
| | | | | | | 441/4 |
| 2013/0266381 | A1 | * | 10/2013 | Pettersen | ................ | B63B 27/24 |
| | | | | | | 405/224.2 |
| 2013/0295802 | A1 | * | 11/2013 | Tomas | ................ | B63B 21/502 |
| | | | | | | 441/3 |
| 2015/0096759 | A1 | | 4/2015 | Gilmore | | |
| 2020/0156926 | A1 | | 5/2020 | Bishop et al. | | |
| 2020/0165888 | A1 | | 5/2020 | Liezenberg et al. | | |
| 2020/0314794 | A1 | * | 10/2020 | Ly | .......................... | B63B 22/16 |

OTHER PUBLICATIONS

International Search Report dated Nov. 9, 2021 of International Application PCT/EP2021/071259 claiming priority this application.

* cited by examiner

*Primary Examiner* — Yves Dalencourt
*Assistant Examiner* — Elizabeth Kassa
(74) *Attorney, Agent, or Firm* — Gregory Adams; David L. Cate (57) ABSTRACT

One general aspect may include a buoy position analyzer system. The buoy position analyzer system also includes a transceiver interface. The buoy position analyzer system also includes a memory storage. The buoy position analyzer system also includes circuitry may include one or more processors configured to: receive node unit data via the transceiver interface, generate an operational movement envelope for a buoy based on the received node data, store the operational movement envelope in the memory storage, and monitor additional node unit data via the transceiver interface.

15 Claims, 6 Drawing Sheets

FLOATING BUOY EXCURSION ANALYZER SYSTEM

FIELD

The field to which the disclosure generally relates floating and subsea hoses used to transport liquids.

BACKGROUND

Subsea and floating hose transport systems are often used in conjunction with an oil platform or an oil rig. In this process, the produced oil is first conveyed from a tanker to the drilling platform via an underwater hose to the buoy. As soon as the capacity of the tanker is depleted, the floating hose is detached from the tanker again so that the tanker can continue on. The floating buoy together with the floating hose remains on the sea. However, it can take several hours or even several days before a new tanker is connected to the floating hose. This is especially true in very rough seas.

The location of the end of the hose may be difficult to find for a tanker due to a lack of location information.

What is needed are techniques to facilitate positioning and location of floating hoses and subsea/underwater hoses.

DETAILED DESCRIPTION

The following description of the variations is merely illustrative in nature and is in no way intended to limit the scope of the disclosure, its application, or uses. The description is presented herein solely for the purpose of illustrating the various embodiments of the disclosure and should not be construed as a limitation to the scope and applicability of the disclosure. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a value range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, gaps between components may present, for example.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Oil transport systems have a buoy and a floating hose. The floating hose is also buoyant. Such systems are often used in conjunction with an oil platform or an oil rig. In this process, the produced oil is first conveyed from the drilling platform via an underwater hose to the buoy and from there via the floating hose to a tanker. The tanker can take the oil. As soon as the capacity of the tanker is reached, the floating hose is detached from the tanker again so that the tanker can call at a port. The floating buoy together with the floating hose remains on the sea.

Such systems include telematics systems that exist on floating buoy systems, locating them with a standard GPS accuracy of +/−2 m accuracy on location, but not monitoring exact location.

These transport systems described above only gives an inaccurate or low accuracy position of the buoy on a regular basis. Accurate measurement is only used irregularly with specialist equipment.

This means that a customer does not have an in-service measurement/monitoring of their buoy position, and is not made aware if there is a problem in various weather/operational conditions.

One or more embodiments are disclosed that facilitate floating hose systems. By providing a more accurate global position reading of the exact location of the buoy, the buoy movement throughout its operation and all weather conditions can be monitored. This will then indicate whether the buoy is moving within it's designed operational movement envelope.

If the buoy is moving outside of its operational movement envelope, this is a key indicator that their may be issues, such as damage to the mooring chains, system and the like, which can cause damage to the sub sea hoses and valve systems.

Wireless nodes located on a buoy provide a snapshot relative location data of each node on a regular basis. This resulting position information is then transmitted through satellite/cellular communication (or other) back to shore.

Through use of the above infrastructure system, and by locating position nodes on the buoy (in two of more locations) we can gain an accurate location of the buoy at time of reading.

The geolocation of a floating buoy system offshore isn't monitored accurately, which can mean damage to mooring lines can go undetected, leading to additional stress and strain on critical equipment like sub sea hoses and valve systems. Sub sea monitoring of these items is extremely difficult and irregular, so by monitoring accurately the simple position of the buoy and alerting the operator if it is outside of the operational position window within minutes of this occurring will be invaluable to the operator.

The system can be programmed to assess the data received on the individual nodes against a pre-defined operational envelope. If the buoy is within the defined operational window, then no action and data just recorded. If the buoy is found to be outside of the operational position window, an alert can be sent to the operator.

Continuous monitoring over a period of time will also greatly improve the accuracy of the monitoring, and enable the system to support the operator to look at where higher loads on mooring systems may occur to direct physical inspections more accurately.

Continuous monitoring of the exact accurate geolocation of the buoy could immediately flag to the operator that the buoy was positioned outside of its working position envelope and allow the operator to intervien immediately to establish the cause and reduce/eliminate any damage to the sub sea systems. This would subsequently avoid damage and the associated additional costs and downtime associated for the operator.

Further features, advantages and possible applications of the present invention result from the following description of the design examples and the figures. All described and/or pictorially represented features, on their own and in any combination, constitute the subject-matter of the invention, also independently of their composition in the individual claims or their withdrawals. The same reference signs for the same or similar objects continue to appear in the figures.

Figure 1:
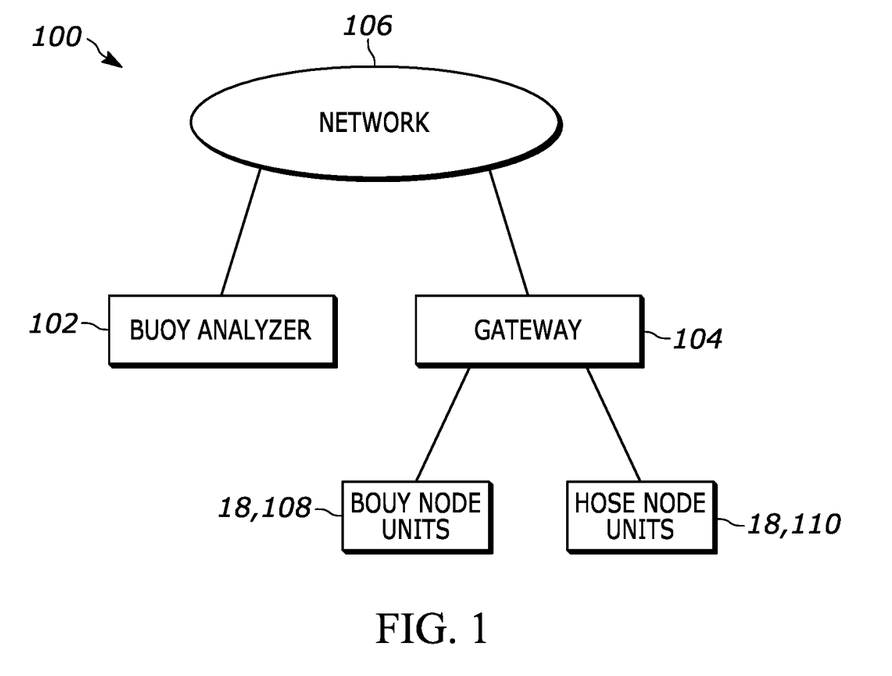
FIG. 1 is a diagram illustrating a buoy analysis system 100 in accordance with one or more embodiments.

FIG. 1 is a diagram illustrating a buoy analysis system 100 in accordance with one or more embodiments. The system 100 is provided for illustrative purposes and it is appreciated that suitable variations are contemplated.

The system 100 can be used with fluid transfer systems, such as single point mooring (SPM) and multiple point mooring (MPM) systems. Some examples of SPM include turret buoys, single anchor leg mooring (SALM), single point mooring towers, Spars, articulated platforms, Catenary Anchor Leg Mooring (CALM) and the like to facilitate tankers loading or discharging liquid near onshore storage, production fields and the like.

The SPM CALM system generally includes a tanker mooring securely to a single buoy in open waters offshore. Then, free ends of floating hoses are connected to the buoy are connected to the tanker and liquid is pumped through the hoses, buoy, subsea risers, manifolds, subsea pipeline, storage and the like. The liquid can be transferred from the tanker to storage and/or from the storage to the tanker.

The system 100 includes an analyzer 102, a gateway 104 and node units 18. The node units 18 include buoy node units 108 and hose node units 110.

The analyzer 102 is configured to receive node data from node units 18 located on buoys, hoses, platforms and the like.

The received node data includes positions, movement, temperature, humidity and the like. The received node data is received from a network 106 by way of the gateway 104.

The network 106 can be a cloud network, wireless network, cellular network, wired network and/or the like.

The analyzer 102 is configured to determine an operational envelope and/or obtain the operational envelope. The operational envelope includes an operational position envelope, which defines or identifies a range of suitable positions and/or locations at which a buoy can move during proper operation. The positions can be specified in terms of horizontal positions, vertical positions, depth, and the like. The operational position envelope can express the range or ranges in terms of location. The operational position envelope can also include variations or changes based on currents, time of day, water temperature, wind and the like.

The analyzer 102 can determine the envelope based on a set of data obtained over a time period, such as a number of days. For example, the analyzer 102 could use the movement/locations over the number of days to identify ranges of locations/positions for the buoy or hoses.

In one example, the operational position envelope is a geometric shape, such as an ellipse, about a surface of the ocean/water.

The analyzer 102 is configured to record data, compare node positions, node movement, temperature, humidity, thresholds and the like.

The analyzer 102 can also be configured to analyze the node data and develop correlations, such as correlations with moon, season and the like. Further, the analyzer 102 can be configured to develop maintenance schedules.

Further, the analyzer 102 can be configured to trigger alarms based on comparisons of the node data with one or more thresholds.

For example, the analyzer 102 can trigger an alarm and/or notification upon node unit data including a position outside of the operational position envelope. Such a position could indicate damage and/or failure being present in the system.

The analyzer 102 is configured to develop and maintain one or more models of floating hose behavior.

The gateway 104 is configured to transmit the node data from node units 18 to the network 106 for reception by the analyzer 102. The gateway 104 is configured to generate transmissions with the data in accordance with one or more compatible protocols and one or more compatible communication channels.

The gateway 104 can be located on a platform, tanker, buoy and the like.

The buoy node units 108 are located on one or more buoys. The units 108 measure and/or generate position information, temperature, humidity and the like. It is appreciated that the node units 108 can communicate with each other, for example, by radio signals. Thus, an individual node unit can pass information from other node units to the gateway 104 and/or the network 106.

The hose node units 110 are located on floating and/or subsea hose segments and/or strings.

In one example, the system 100 is used with a fluid transfer system that includes, proceeding from the tanker manifold to the onshore storage: floating hoses (making up a hose strings), a product swivel housed inside the buoy that provides a fluid transfer path between the geostatic part and the rotating part of the buoy, subsea hose risers between the buoy and a pipeline end manifold (PLEM) or pipeline end termination (PLET), PLEM housing the various valves and Subsea pipeline/s between the PLEM and onshore storage.

Floating hoses transfer the fluid product between the tanker manifold to the SPM. They are permanently connected to the buoy at one end. The loose end is picked up by a tanker tanker crane/derrick and connected to the tanker's midship manifold during operation. The loose ends are not tied back to the buoy between operations, but floats freely.

Each hose string consists of a plurality of individual hoses (typically 9 m to 12 m in length) flanged together to make up a string of suitable length for operations, taking into consideration the buoy design, ocean conditions and size of tankers visiting the SPM. String lengths are typically from 150 m to 250 m but they can be made up to any suitable required length. Typically, a SPM will have connections available for 2 floating hose strings, but can be less or more.

During operation, the hose strings float and stream in a specific bight, as seen next to the tanker and an incorrect length hose string will have undesirable consequences.

The hose strings are generally sound against leakages, flexible, positively buoyant and operable for harsh open sea conditions.

Liquid handling through the buoy involves piping similar that includes, elbows, spools, expansion joints, floating flanges, valves, and the like.

The buoy can include a product swivel, which allows the system to weathervane while the liquid is flowing. This is also called a Product Bearing, and has a number of seals between the inner and outer races to prevent product seeping into the bearing and also to the outside. The buoy can include a Multiple Product Distribution Unit (MPDU) which, as the name suggests, allows simultaneous pumping of different products without intermixing.

Subsea hose risers form the link between the underside of the buoy and the PLEM. They are installed in a few basic configurations, designed to accommodate tidal depth variation and lateral displacement due to mooring loads. The hose curvature changes to accommodate lateral and vertical movement of the buoy—within an acceptable footprint—while the hoses are supported at near neutral buoyancy by floats along its length.

Some suitable subsea hose string arrangements are Chinese lantern, Lazy-S, Midwater Arch, Steep-S and the like. The Chinese Lantern includes two to four mirror symmetrical hoses connect the PLEM with the buoy, with the convexity of the curve facing radially outwards—giving the outlined shape of a traditional chinese lantern. The Lazy-S arrangement includes where a riser hose leaves the PLEM at a steep angle, then flattens out before gradually curving upwards to meet the buoy approximately vertically, in a shape that looks like a flattened S-surve. The Midwater Arch arrangement includes a steel arch with buoyancy that is suspended from a seabed and tied back to a gravity anchor, and the hose is run over the arch, down into a bight and up to the buoy again. The Steep-S arrangement is where the hose or string first rises roughly vertically to a submerged float, before making a sharp bend downwards followed by a slow curve through horizontal to a vertical attachment to the buoy. It is appreciated that other suitable hose arrangements are contemplated.

Figure 2:
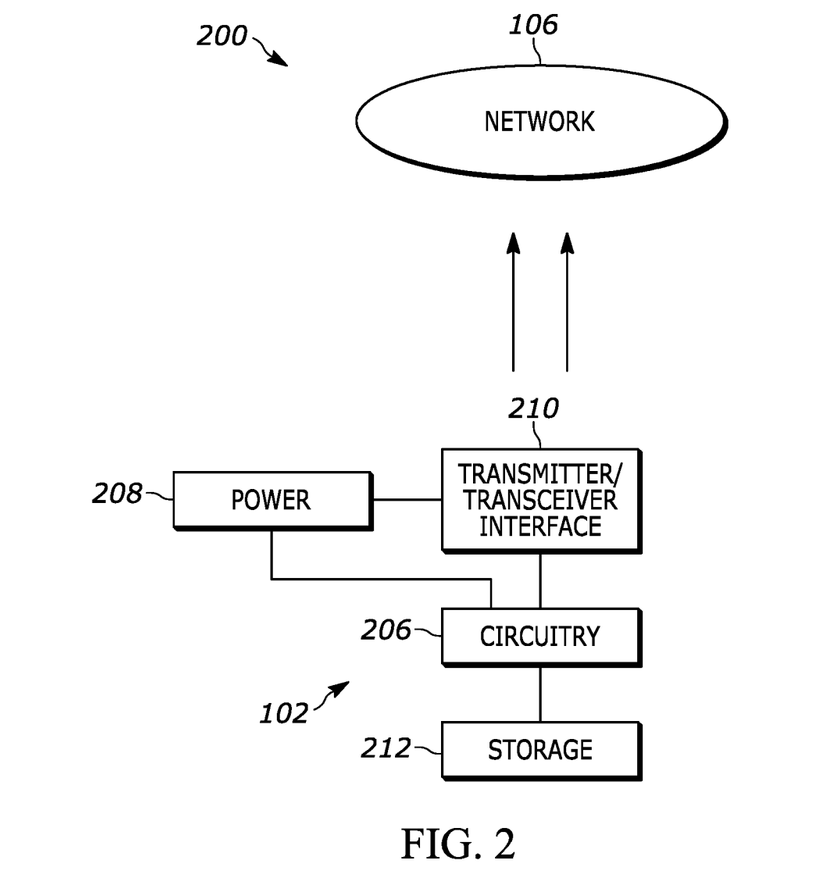
FIG. 2 is a diagram illustrating the analyzer 102 in accordance with one or more embodiments.

FIG. 2 is a diagram illustrating the analyzer 102 in accordance with one or more embodiments. The analyzer 102 is provided for illustrative purposes and it is appreciated that suitable variations are contemplated.

The analyzer 102 includes a power supply 208, a transceiver interface 210 and circuitry 206.

The power supply 208 is configured to provide suitable power for the transceiver 210 and the circuitry 206. In one example, the power supply 208 is battery power. In another example, the power supply 208 is a constant power or mains power.

The transceiver interface 210 is connected to a transceiver (not shown) and provides data/information for transmission to the network 106 and receives data/information from the network 106.

The circuitry 206 can includes suitable circuits, integrated circuits, one or more processors, memory devices, logic, registers and the like. The circuitry 206 can perform the functionality of the analyzer 102.

The circuitry 206 is configured to determine an operational movement envelope and/or obtain the operational movement envelope, record data, compare node positions, node movement, temperature, humidity, thresholds analyze the node data and develop correlations, such as correlations with moon, season and the like. Further, the circuitry 206 can be configured to develop maintenance schedules and trigger alarms based on comparisons of the node data with one or more thresholds.

The operational movement envelope is also referred to as the operational position envelope.

Figure 3:
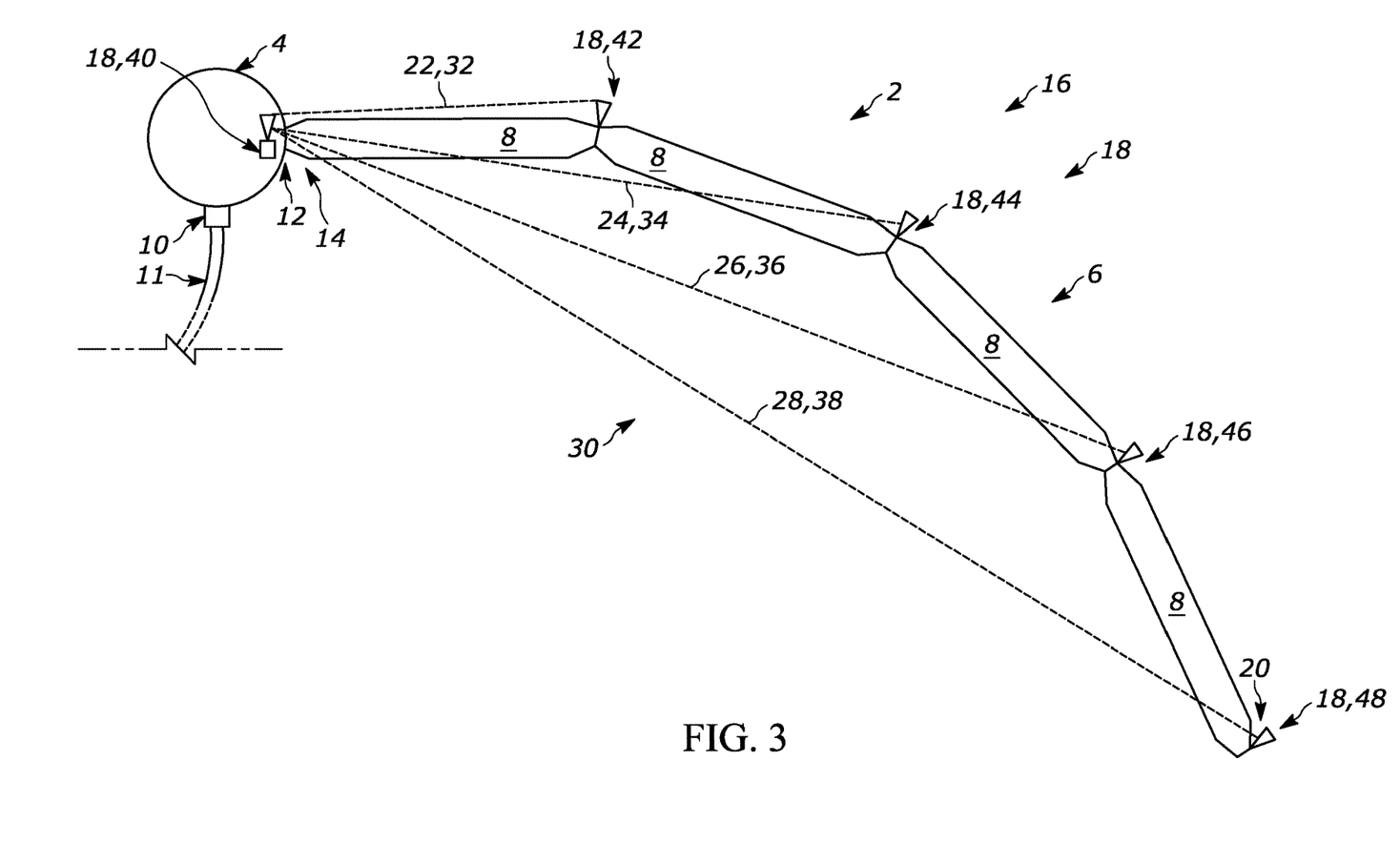
FIG. 3 shows system 2 with a buoy 4 and a buoyant floating hose 6. The floating hose 6 is formed by a number of floating hose segments 8.

FIG. 3 shows system 2 with a buoy 4 and a buoyant floating hose 6. The floating hose 6 is formed by a number of floating hose segments 8. The hose segments 8 are connected to each other in a row one behind the other in such a way that the floating hose 6 is formed by the hose segments 8 with a continuous, common fluid channel extending from a first end 14 of the hose 6 to a second end 20 of the hose 6. With the first end 14 the floating hose 6 is coupled to a liquid outlet connection 12 of the buoy 4 in such a way that liquid can flow from the liquid outlet connection 12 into the liquid channel of the floating hose 6.

System 2 is used to swim on the sea. System 2 is therefore a buoyant system. It can swim on water. The same applies to each hose segment 8 or to the floating hose 6 as well as to the buoy 4. The buoy 4 can be connected to an underwater hose 11 by means of a fluid inlet connection 10, which is only shown in sections and schematically in FIG. 3. Via the underwater hose 11, liquid, in particular oil, can be conveyed from a drilling platform to the buoy or the associated liquid input connection 10. The liquid inlet port 10 is connected directly or switchably to the liquid outlet port 12. Oil that flows through the underwater hose to the liquid inlet connection 10 of the buoy 4 can then be pumped through the liquid outlet connection 12 and the floating hose 6 coupled to it. The second end 20 of the floating hose 6 can be coupled to a floating tanker (i.e. a ship designed as a tanker) into which the oil can flow. However, the floating tanker is not permanently coupled to the second end 20 of the floating hose 6. As soon as the tanks of the floating tanker are full, the second end 20 of the floating hose 6 is decoupled from the floating tanker so that the floating tanker can call at a port. In the time the swimming hose 6 with the free, second end 20 floats on the sea. In stormy weather and a correspondingly high swell, the floating hose 6 may overlap in a loop. Reconnecting the floating tanker to the second end of the floating hose is then difficult, if not impossible. In order to be informed before the arrival of the floating tanker whether the floating hose 6 can be connected to the floating tanker without any problems, it is intended that the system 2 has a plurality of node units 18.

The plurality of node units 18 are attached to the floating hose 6 and the buoy 4 and include that the node units 18 are distributed between the buoy 4 and the second end 20 of the floating hose 6. For example, it may be provided that a node unit 18, designated as main unit 40, is attached to buoy 4. Another node unit 18 may be designated as first node unit 42, which is attached to the end of the first hose segment 8 facing away from buoy 4. The same can apply to each of the other hose segments 8. Thus, a second node unit 44 can be provided for the second hose segment 8, a third node unit 46 for the third hose segment 8 and a fourth node unit 48 for the fourth hose segment 8. The junction units 42, 44, 46, 48 assigned to the hose segments 8 can be firmly attached to the respective hose segment 8.

Each of the node units 18 is designed by means of an associated radio unit to establish a radio link 22, 24, 26, 28 to each of at least two of the other radio units of the respective node units 42, 44, 46, 48, so that a radio network 30, in particular a mesh radio network, is formed therefrom. An example of this is shown in FIG. 1 using node unit 18, referred to as Main Unit 40. The radio unit of the main unit 40 can establish a first radio connection 22 to the radio unit of the first node unit 42. The same applies to the second radio link 24 to the second node unit 44, the third radio link 26 to the third node unit 46 and the fourth radio link 28 to the fourth node unit 48. Signals, in particular reference signals, can be exchanged via radio links 22, 24, 26, 28. Based on the exchanged signals, the relative distances between the node units 18 can be determined. It is thus provided that each node unit 18, 40, 42, 44, 46, 48 is designed to determine a relative distance 32, 34, 36, 38 to each further node unit 42, 44, 46, 48 connected via a radio link 22, 24, 26, 28 based on the respective radio link 22, 24, 26, 28. This will be explained purely by way of example using the radio links 22, 24, 26, 28, which are shown in FIG. 3.

For example, the first radio link 22 between the Main Unit 40 and the first Node Unit 42 can be used to determine the first relative distance between the Main Unit 40 and the first Node Unit 42. The same can be provided for the second radio link 24, the third radio link 26 and the fourth radio link 28, so that the corresponding relative distance, namely the second relative distance 34, the third relative distance 36 and the fourth relative distance 38, can be determined from these. Since each of the node units 18 can establish corresponding radio links via the associated radio units, this results in a large number of radio links that allow the corresponding distances to be determined, which are then referred to as relative distances. These relative distances are suitable for determining the geometric arrangement 16 of the floating tube 6 relative to buoy 4. It is therefore intended that at least one of the node units 18 is designed as the main unit 40. In FIG. 1, this is exemplified by the node unit 18, which is attached to buoy 4. This main unit 40 is also designed to collect the relative distances determined by the other node units 42, 44, 46, 48 via radio links 22, 24, 26, 28 and/or radio network 30. In addition, based on the collected relative distances 32, 34, 36, 38, the main unit 40 is designed to determine location data representing the geometric arrangement 16 of the floating hose 6 relative to buoy 4. With these location data it is therefore possible to make a statement as to whether the floating hose 6 has, for example, a loop or another shape which prevents a floating tanker from being able to couple easily and reliably to the second end 20 of the floating hose 6, or whether the arrangement 16 of the floating hose 6 allows the floating tanker to be coupled easily and reliably to the second end 20. It is therefore envisaged that the Main Unit 40 will include a Radio Transmitter Unit 50, which is designed to wirelessly transmit a location signal representing the location data. In this context, reference is made to FIG. 2, in which System 2 is again shown schematically, although the marking of the exemplary radio links and relative distances has been omitted here.

Figure 4:
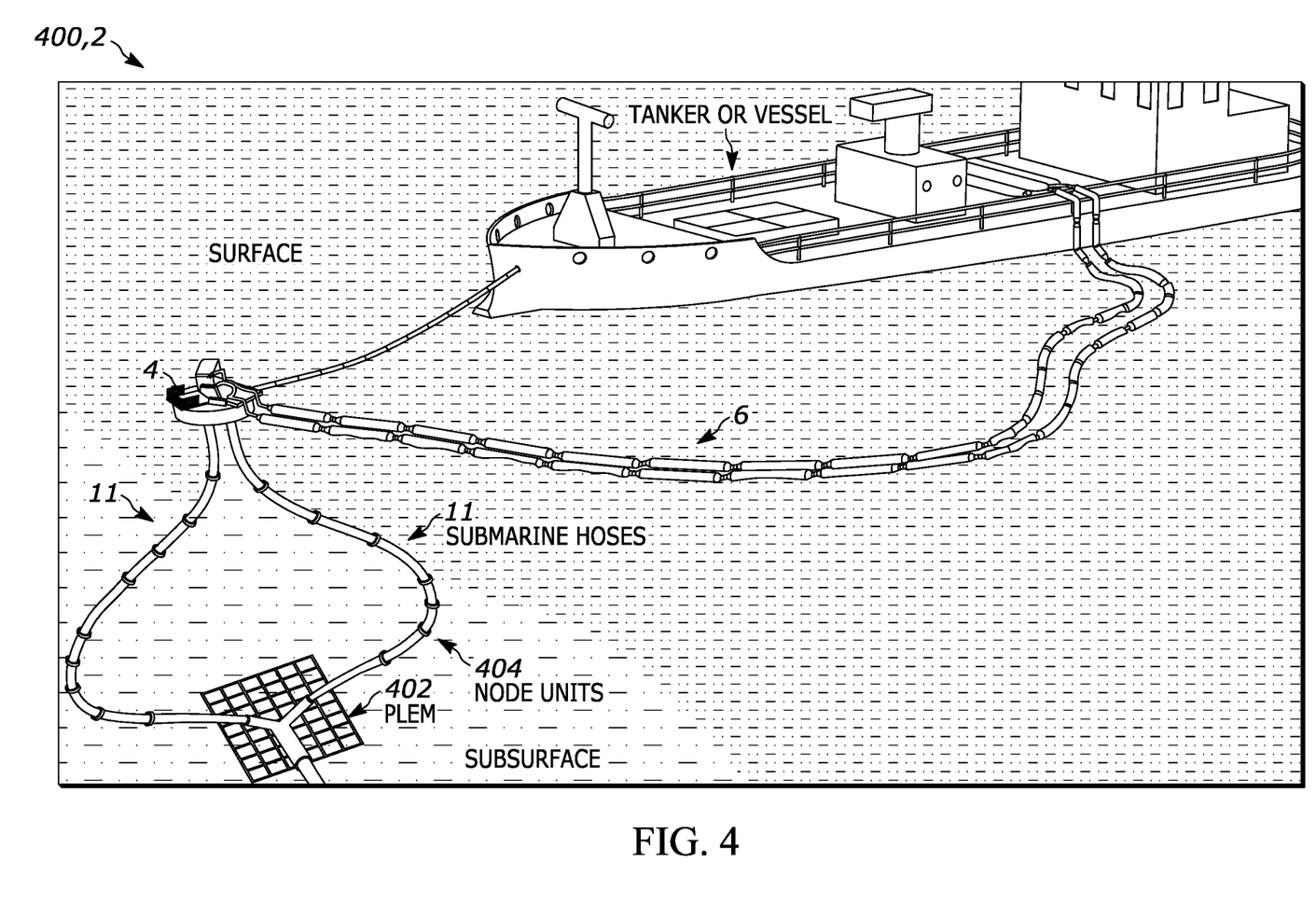
FIG. 4 shows a land-based base station 52, which has a radio receiver 54 designed to receive the location signal transmitted by the radio transmitter unit 50.

FIG. 4 shows a land-based base station 52, which has a radio receiver 54 designed to receive the location signal transmitted by the radio transmitter unit 50. The receiver unit 54 can be coupled with a computing unit 56 of the base station 52, so that the location data represented by the received location signal can be transmitted to the computing unit 56 by the radio receiver 54. The arithmetic unit 56 can be designed to evaluate the location data. In particular, the computing unit 56 can be configured to determine the position of the floating hose 6 relative to buoy 4 based on the location data. It has been explained above that the base station 52 is located on land. However, this is not absolutely necessary. For example, the location signal can be transmitted by means of the radio transmitter unit 50 to a satellite, which in turn transmits the location signal or a signal dependent on it via further signal transmission stations to the radio receiver 54. The radio receiver 54 can also be designed (and also called) a wired receiver if it is directly coupled to a network that can establish a signal connection to a satellite. Alternatively or in addition, the base station 52 can also be installed on a ship, especially on a floating tanker. Then the information about the arrangement of the floating hose 6 is already available on the floating tanker before it arrives at system 2.

The radio units of the node units 18 can be trained to establish radio links 22, 24, 26, 28 over a range of between 1 meter and 1000 meters. On the other hand, the radio transmitter unit 50 is preferably designed to enable the radio transmitter unit to transmit the location signal to a radio receiver 54 located more than 3000 meters away. For example, the radio transmitter unit 50 can be designed to transmit the location signal with a range of at least 10 kilometers.

Figure 5:
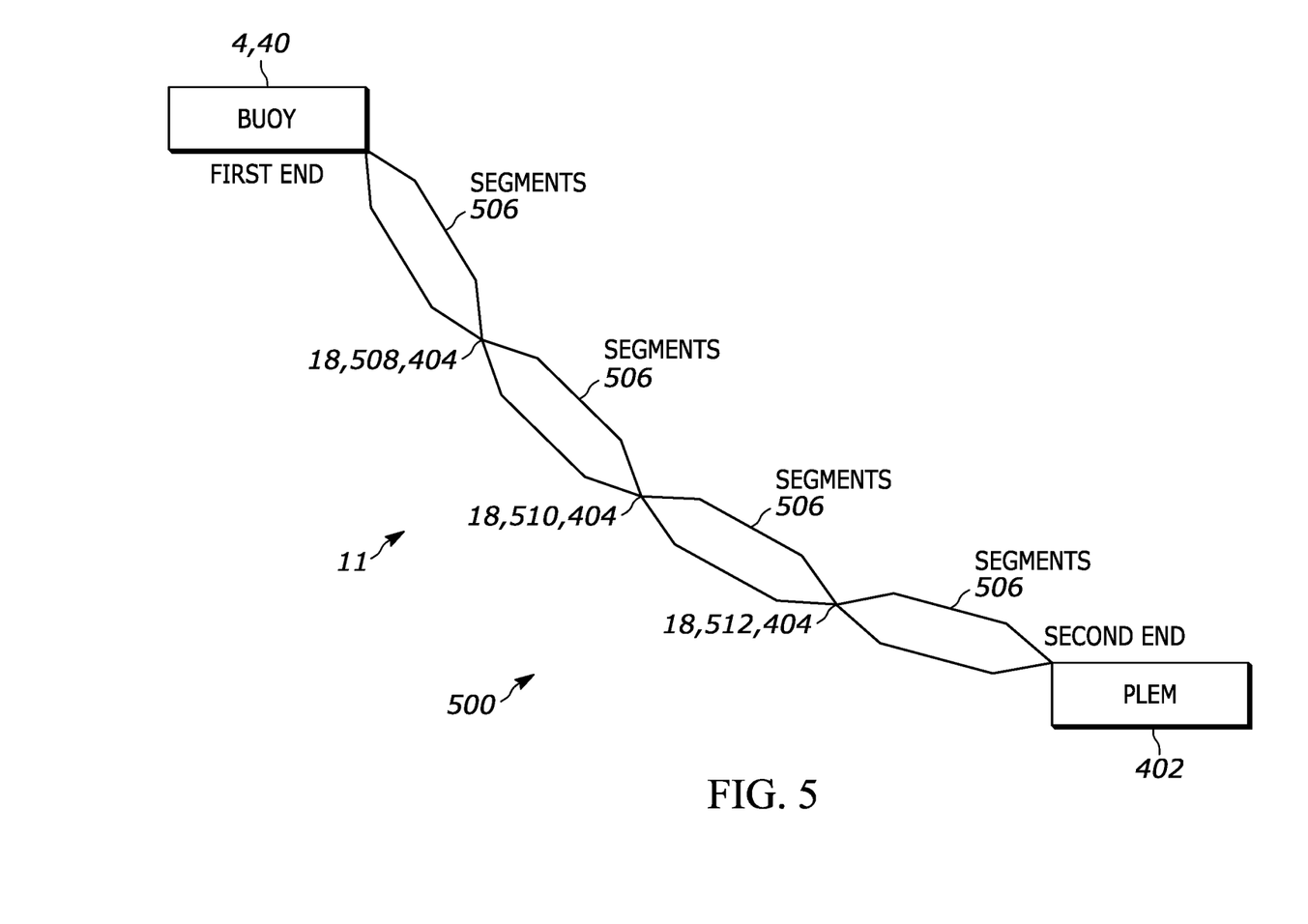
FIG. 5 is a diagram illustrating a fluid transfer system 500 in accordance with one or more embodiments.

As can be seen schematically from the overview of 3-5, the hose segments 8 are connected to each other at the front so that they form the floating hose 6, also referred to as a string. Each of the hose segments 8 can have a connecting flange 58 at opposite end sections. Each connecting flange 58 is designed for detachable connection to another connecting flange 58, in particular to another hose segment 8. FIG. 3 shows a schematic diagram of an end section of a hose segment 8. This also shows the connecting flange 58 schematically. The following explanations can be applied analogously to each hose segment 8.

As can be seen schematically from FIG. 3, a junction unit 18 is assigned to the hose segment 8 is arranged and/or fastened to the connecting flange 58. Thus the corresponding node unit 18 can be attached to the connecting flange 58 with a screw connection. For this purpose, the screws can be used which connect the connecting flange 58 with an oppositely arranged connecting flange 58 of another hose segment 8. Each node unit (which can also be referred to as a knot unit) is designed to be 18 watertight. This is of particular advantage when used in the sea, as not only the hose segments 8 but also the node units 18 are or can be exposed to seawater. It is also appreciated that each of the node units 18 can have a source of energy, such as a battery, in particular a rechargeable battery. The capacity of the battery is selected so that the node unit 18 can be operated for a duration, such as at least 18 months, without changing the battery.

In order to better protect the node unit 18 from mechanical shocks and/or from seawater, it may be provided that the node unit 18 assigned to the hose segment 8 is embedded in an outer jacket wall of the respective hose segment 8. The outer part of the jacket wall often has rubber material, in which the respective node unit 18 can be embedded. The advantage of embedding a node unit 18 in the rubber material 62 of a hose segment 8 is that the respective node unit 18 is particularly easily and safely protected against seawater but also against mechanical shocks. However, when embedding the node unit 18 in the rubber material 62, it is preferable that a capacity of the battery of the node unit 18 is such that the node unit 18 can be operated for several years, in particular at least 5 years, without changing the battery.

The jacket wall 60 can be formed by several layers arranged on top of each other in the radial direction. The node unit 18 of a hose segment 8 can therefore also be arranged in a layer further inside the jacket wall, so that even better protection against seawater and/or mechanical shocks can be ensured.

It is also noted that the Main Unit 40 may have a navigation unit designed to receive a navigation signal. In addition, the navigation unit can be designed to determine a location, in this case the location of the buoy 4. Therefore, by means of the navigation unit and the received navigation signal, further information can be added to the location data, which goes beyond the arrangement of the floating hose 6. It is preferred that the Main Unit 40 is configured to supplement the location data in such a way that the location data also represent the geographical buoy location. If this location data is now sent by means of the location signal from the radio transmitter unit 50 of the main unit 40, it can be received, for example, by the floating tanker that is on its way to system 2. Based on the received location signal, it can therefore be evaluated whether the arrangement of the floating hose 6 relative to the buoy 4 is such that a successful coupling of the floating tanker to the second end 20 of the floating hose 6 is possible. In addition, based on the geographical buoy location of buoy 4 and, moreover, the geometric arrangement of the floating hose 6 relative to buoy 4, it can be determined how the floating tanker approaches system 2 in order to effectively prevent a collision with floating hose 6.

It is appreciated that the use of the term radio can include communication using radio frequency (RF), Bluetooth, Bluetooth LE, Bluetooth smart, Long Range (LoRa) low-power wide-area network (LPWAN) technology, ultra wide bandwidth (UWB), Long Term Evolution (LTE), 4G, 5G and the like.

Another design or embodiment that can utilize the hoses with location or position sensing include is at an import terminal or an export terminal. Here, floating hose based arrangements applicable on Floating, Production, Storage and Offloading vessels (FPSOs) via a hose real or floating hose.

Another design or embodiment includes where a tanker supplies oil from the tanker, through the floating hose, through the buoy, through the underwater hose, through a PLEM and to a pipeline. The pipeline then transports the oil to, for example, an on-shore refinery. Similarly, the pipeline can transport oil from a land-based drilling operation through the PLEM, through the underwater hose, through the buoy, through the floating hose and to a tanker.

Another design or embodiment includes an application wherein the location information for the hoses is utilized to ensure that the floating hose and/or underwater hose are in a safe condition. Problematic conditions that can be identified by the circuitry include hose wrapped around the buoy, hose overlapped on itself or other object, hose bent too tightly, not in a proper or suitable working envelope (2 or 3D or axis envelope), and the like.

It is appreciated that I-nodes can utilize GPS functionality.

It is also appreciated that the hoses have suitable lengths. Some examples of typical lengths include 30 feet (9.1 meters), 35 feet (10.7 meters), and 40 feet (12.2 meters).

It is appreciated that the relative distances can be utilizes to determine a bend or bentness of the hoses described herein.

FIG. 5 is a diagram illustrating a fluid transfer system 500 in accordance with one or more embodiments. The system 500 includes location sensing for underwater hoses and the like used for fluid transport. The system 500 is provided for illustrative purposes and it is appreciated that suitable variations are contemplated.

The system 500 can also be the system 2, described above. Thus, the description of the system 2 can be referenced for additional description.

Generally, underwater hoses, also referred to as subsea hoses, are subject to damage and/or failure due to weather conditions, mooring lines, and the like. Approaches to identify damaged and/or locate underwater hoses include diving operations. Such operations are expensive, have safety concerns and are not possible during bad weather. Further, these approaches are intermittent.

The system 500 permits continuous monitoring of underwater hoses that includes location information.

The system 500 includes a buoy 4, a buoyant floating hose 6 and one or more underwater hoses 11. The floating hose 6 is connectable to a tanker and the like for sending and/or receiving fluid, such as oil. The floating hose 6 transfers fluid via the buoy 4 from/to the underwater hoses 11.

The buoy 4 includes one or more node units that generate node unit data.

The underwater hoses 11 are configured to transfer fluid between the buoy 4 at a first end and a second end. In this example, a pipeline end manifold (PLEM) or pipeline end termination (PLET) system 502 is connected to the second end of the underwater hoses 11.

The underwater hoses 11 include underwater node units that generate or transmit node unit data.

The node unit data can include, but is not limited to, acoustic signals, radio signals and optical signals to the main unit 40 at the hub. The main unit 40 is configured to determine position information and the like for the underwater hoses 11, hose 6, the buoy 4, and the like based on the node unit data.

The system 500 can remotely monitor relative position of submarine or underwater hoses (passive system) buoy and provide warnings when hose string or buoy is in potentially 'dangerous' position which may lead to damage.

The system 500 can be employed for hose applications where the position of the hose is of interest to the operator— for example dredging, deep sea mining, sea water intake systems and the like.

Further, the system 500, such as circuitry in the node units or elsewhere, can be configured to monitor the relative position of the underwater hoses to identify problematic conditions, described above.

Figure 6:
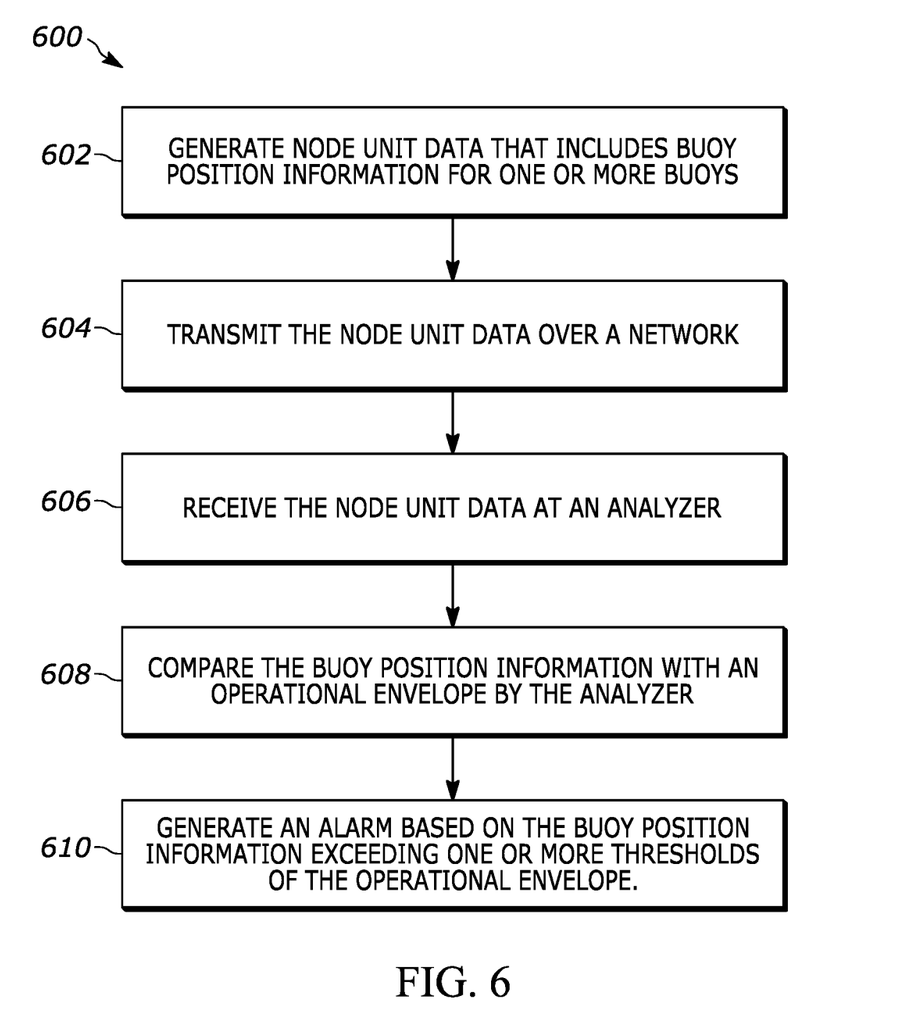
FIG. 6 is a flow diagram illustrating a method 600 for analysing buoy position for a fluid transfer system in accordance with one or more embodiments.

FIG. 6 is a flow diagram illustrating a method 600 for analysing buoy position for a fluid transfer system in accordance with one or more embodiments. The method 600 can be performed using the systems described above, such as system 2 and system 100 and 500. Further, it is appreciated that the method can include additional blocks or steps and omit recited steps in suitable variations of the method 600.

The method 600 is directed to a hose transfer system.

One or more node units generate node unity data that includes buoy position formation at 602.

The one or more node units transmit the node unit data over a network at 604.

An analyzer receives the node unit data at 606.

The buoy position information is compared with an operational envelope by the analyzer at 608.

An alarm is generated by the analyzer if the buoy position information varies from the operational envelope at 610.

A plurality of location signals are generated by a plurality of underwater node units distributed along a length of the underwater hose at block 1002.

A plurality of relative distances based on the plurality of locations signals are generated at block 1004.

A geometric shape and locations for the underwater hose is/are determined at block 1006.

Problematic conditions associated with the underwater hose are identified at block 1008.

The method 1000 can also transmit the identified problematic conditions to a land based station, tanker, oil platform, and the like.

The method 1000 can also adjust flow of fluid through the underwater hose based on the identified problematic conditions. For example, if a hose segment is bent too sharply, the method 1000 can stop transfer of fluid through the underwater hose. As another example, if there are no identified problematic conditions transfer of fluid through the underwater hose can begin and/or continue.

It should be added that 'having' does not exclude other elements or steps and 'one' or 'one' does not exclude a multitude. It should also be noted that characteristics described with reference to one of the above examples of execution can also be used in combination with other characteristics of other examples of execution described above. Reference signs in the claims are not to be regarded as a restriction.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Additionally, at least one processor can comprise one or more modules operable to perform one or more of the s and/or actions described herein.

For a software implementation, techniques described herein can be implemented with modules (e.g., procedures, functions, and so on) that perform functions described herein. Software codes can be stored in memory units and executed by processors. Memory unit can be implemented within processor or external to processor, in which case memory unit can be communicatively coupled to processor through various means as is known in the art. Further, at least one processor can include one or more modules operable to perform functions described herein.

Techniques described herein can be used for various wireless communication systems such as CDMA, TDMA, FDMA, OFDMA, SC-FDMA and other systems. The terms "system" and "network" are often used interchangeably. A CDMA system can implement a radio technology such as Universal Terrestrial Radio Access (UTRA), CDMA1800, etc. UTRA includes Wideband-CDMA (W-CDMA) and other variants of CDMA. Further, CDMA1800 covers IS-1800, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.18, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA1800 and UMB are described in documents from an organization named "3rd Generation Partnership Project 2" (3GPP2). The techniques can also be used with new radio (NR) 5G, also from the 3GPP organization. Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Further, the actions of a method or algorithm described in connection with aspects disclosed herein can be embodied directly in hardware, in a software module executed by a processor, or a combination thereof. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the s and/or actions of a method or algorithm can reside as one or any combination or set of codes and/or instructions on a machine-readable medium and/or computer readable medium, which can be incorporated into a computer program product.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner", "adjacent", "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus, system, and the like to perform the actions.

One general aspect includes a buoy position analyzer system. The buoy position analyzer system also includes a transceiver interface. The buoy position analyzer system also includes a memory storage. The buoy position analyzer system also includes circuitry may include one or more processors configured to: receive node unit data via the transceiver interface, generate an operational movement envelope for a buoy based on the received node data, store the operational movement envelope in the memory storage, and monitor additional node unit data via the transceiver interface.

Implementations may include one or more of the following features. The system may include a main unit configured to collect the plurality of relative distances and determine buoy location based information. The circuitry is further configured to compare the monitored additional node unit data with the operational movement envelope. The circuitry is further configured to trigger an alarm based on the monitored additional node unit data exceeding a threshold. The threshold is allowed movement of the buoy. The threshold includes allowed movement of the buoys, a floating hose, and a subsea hose. The operational movement envelope is based on movement of a plurality of node units over a period of time. The node units are attached to the plurality of buoys. Some of the node units are attached to hoses. The node unit data and the additional node unit data includes node battery status, node condition, wind speed, wind direction, water current, position, temperature and humidity. The circuitry is further configured to utilize a one or more mathematical models to generate the operational movement envelope. The one or more models incorporates tide, water temperature, and seasonal information. The node unit data is received from a cloud network. Implementations of the described techniques may include hardware, a method or process, or computer software on a computer-accessible medium.

One general aspect includes a fluid transfer system. The fluid transfer system also includes a plurality of node units attached to one or more buoys and configured to generate node unit data. The fluid transfer system also includes a gateway configured transmit the node unit data to a network. The fluid transfer system also includes an analyzer configured to receive the node unit data from the network and to generate an operation movement envelope for the plurality of buoys.

Implementations may include one or more of the following features. The system where the analyzer is configured to monitor the node unit data after generating the operation movement envelope. The operation movement envelope includes movement of the plurality of node units over a period of time. The buoy is floating and anchored. Implementations of the described techniques may include hardware, a method or process, or computer software on a computer-accessible medium.

One general aspect includes a method of analyzing buoy position information. The method of analyzing buoy position information also includes generating node unit data that includes buoy position information for one or more buoys. The method of analyzing buoy position information also includes transmitting the node unit data over a network. The method of analyzing buoy position information also includes receiving the node unit data at an analyzer. The method of analyzing buoy position information also includes comparing the buoy position information with an operational envelope by the analyzer. The method of analyzing buoy position information also includes generating an alarm based on the buoy position information exceeding one or more thresholds of the operational envelope.

Implementations may include one or more of the following features. The method where the node unit data includes temperature. The method may include generating the operation envelope based on buoy position information. Implementations of the described techniques may include hardware, a method or process, or computer software on a computer-accessible medium.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

REFERENCE CHARACTER LIST (PART OF THE DESCRIPTION)

2 System
4 Buoy
6 Swim hose
8 Hose segment
10 Liquid inlet connection
11 Underwater hose
12 Liquid outlet connection
14 first end
16 Arrangement
18 Node unit
20 second end
22 first radio contact
24 second radio connection
26 third radio link
28 fourth radio link
30 Radio network
32 first relative distance
34 second relative distance
36 third relative distance
38 fourth relative distance
40 Main unit
42 first node device
44 second node device
46 third node unit
48 fourth node unit
50 Radio transmitter unit
52 Base station
54 Radio receiver
56 Unit of account
58 Connection flange
60 Sheath wall
62 Rubber material

What is claimed is:

1. A buoy position analyzer system, the system comprising:
    a transceiver interface;
    a memory storage;
    circuitry comprising one or more processors configured to:
        receive node unit data via the transceiver interface;
        generate an operational movement envelope for a buoy based on the received node data and on movement of a plurality of node units over a period of time;
        store the operational movement envelope in the memory storage; and
        monitor additional node unit data via the transceiver interface;
        compare the monitored additional node unit data with the operational position or movement envelope;
        trigger an alarm based on the monitored additional node unit data exceeding a threshold; and
        the threshold includes allowed movement of the buoys, a floating hose, and a subsea hose.

2. The system of claim 1, further comprising a main unit configured to collect the plurality of relative distances and determine buoy location or position information.

3. The system of Tim wherein the circuitry is further configured to compare the monitored additional node unit data with the operational position or movement envelope.

4. The system of claim 1, wherein the node units are attached to the plurality of buoys.

5. The system of claim 1, wherein some of the node units are attached to hoses.

6. The system of claim 1, wherein the node unit data and the additional node unit data includes node battery status, node condition, wind speed, wind direction, water current, position, temperature and humidity.

7. The system of claim 1, wherein the circuitry is further configured to utilize a one or more mathematical models to generate the operational positional envelope.

8. The system of claim 7, wherein the one or more models incorporates tide, water temperature, and seasonal information.

9. The system of claim 1, wherein the node unit data is received from a cloud network.

10. The system of claim 1, the node unit data consisting of position, temperature, and humidity information.

11. A fluid transfer system, the system comprising:
a plurality of node units attached to one or more buoys and configured to generate node unit data;
a gateway configured transmit the node unit data to a network;
an analyzer configured to receive the node unit data from the network and to generate an operation movement envelope for the plurality of buoys based on movement of the plurality of node units over a period of time.

12. The system of claim 11, wherein the analyzer is configured to monitor the node unit data after generating the operation movement envelope.

13. The system of claim 11, wherein the buoy is floating and anchored.

14. A method of analyzing buoy position information, the method comprising:
generating node unit data that includes buoy position information for one or more buoys, the node unit data additionally comprising temperature for the one or more buoys;
transmitting the node unit data over a network;
receiving the node unit data at an analyzer;
comparing the buoy position information with an operational envelope by the analyzer; and
generating an alarm based on the buoy position information exceeding one or more thresholds of the operational envelope.

15. The method of claim 14, further comprising generating the operation envelope based on buoy position information.

* * * * *